US011981796B2

(12) United States Patent
Kusumoto et al.

(10) Patent No.: US 11,981,796 B2
(45) Date of Patent: *May 14, 2024

(54) CELLULOSE ACETATE RESIN COMPOSITION

(71) Applicant: Daicel Corporation, Osaka (JP)

(72) Inventors: Masaaki Kusumoto, Tokyo (JP);
Takafumi Kawasaki, Tokyo (JP);
Akihiro Higuchi, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/978,224

(22) Filed: Nov. 1, 2022

(65) Prior Publication Data

US 2023/0055648 A1    Feb. 23, 2023

Related U.S. Application Data

(63) Continuation of application No. PCT/JP2020/030469, filed on Aug. 7, 2020.

(51) Int. Cl.
| C08L 1/12 | (2006.01) |
| C08J 5/18 | (2006.01) |
| C08K 3/22 | (2006.01) |
| C08K 3/26 | (2006.01) |
| C08K 3/34 | (2006.01) |
| C08K 5/11 | (2006.01) |
| C09D 101/02 | (2006.01) |

(52) U.S. Cl.
CPC . *C08L 1/12* (2013.01); *C08J 5/18* (2013.01); *C08K 3/22* (2013.01); *C08K 3/26* (2013.01); *C08K 3/346* (2013.01); *C08K 5/11* (2013.01); *C09D 101/02* (2013.01); *C08J 2301/12* (2013.01); *C08K 2003/222* (2013.01); *C08K 2003/265* (2013.01)

(58) Field of Classification Search
CPC ...... C08K 3/22; C08K 3/26; C08K 2003/222; C08K 2003/265; C09D 101/02; C08L 1/12

See application file for complete search history.

(56) References Cited

U.S. PATENT DOCUMENTS

| 2011/0098463 | A1 | 4/2011 | Yoshitani et al. |
| 2011/0193255 | A1* | 8/2011 | Hashimoto ............. B29C 48/04 264/143 |
| 2019/0092929 | A1* | 3/2019 | Tanaka ...................... C08L 1/14 |
| 2022/0227973 | A1* | 7/2022 | Matsumura ............... C08K 5/10 |
| 2022/0267574 | A1* | 8/2022 | Matsumura ............... C08K 3/22 |

FOREIGN PATENT DOCUMENTS

| CN | 111138721 A * | 5/2020 | ............... B29D 7/01 |
| DE | 10 2004 007 941 A1 | 9/2005 | |
| EP | 1 109 858 B1 | 4/2003 | |
| EP | 2075261 A1 * | 7/2009 | ............... C08B 3/00 |
| EP | 3 862 388 A1 | 8/2021 | |
| JP | 8-53575 A | 2/1996 | |
| JP | 11-255959 A | 9/1999 | |
| JP | 2002-60545 A | 2/2002 | |
| JP | 2007-051304 A | 3/2007 | |
| JP | 2007-154136 A | 6/2007 | |
| JP | 2010-241848 A | 10/2010 | |
| JP | 2015-140432 A | 8/2015 | |
| JP | 2018-500416 A | 1/2018 | |
| WO | WO-2007066825 A1 * | 6/2007 | ............... C08B 3/16 |
| WO | 2016/092024 A1 | 6/2016 | |

OTHER PUBLICATIONS

Machine translation of Su et al. (CN 111138721), publication date May 12, 2020.*
Extended European Search Report dated Sep. 7, 2023 in European Patent Application No. 20947814.8, citing references submitted on Oct. 10, 2023. The required fee was paid on Oct. 10, 2023.

* cited by examiner

*Primary Examiner* — Jun Li
(74) *Attorney, Agent, or Firm* — XSENSUS LLP

(57) ABSTRACT

A cellulose acetate resin composition may include a cellulose acetate (A) having a total degree of acetyl substitution of 2.60 or less; a filler (B); and a plasticizer (C). The filler (B) may be selected from the group consisting of (b1) a predetermined inorganic compound, (b2) a predetermined metal salt, (b3) cellulose or hemicellulose, and (b4) wood flour. The plasticizer (C) may be selected from (c1) a glycerin ester-based plasticizer, (c2) an ether-based plasticizer, and (c3) a glycol ester-based plasticizer. A content of the component (A) may be from 4.5 to 90 mass %. A total content of the component (B) may be from 5 to 50 mass %. A total content of the component (C) may be from 5 to 35 mass %.

18 Claims, No Drawings

CELLULOSE ACETATE RESIN COMPOSITION

CROSS-REFERENCE TO RELATED APPLICATION

This application is a continuation of International Application No. PCT/JP2020/030469, filed Aug. 7, 2020, which is incorporated herein by reference in its entirety.

TECHNICAL FIELD

The present disclosure relates to a cellulose acetate resin composition. Specifically, the present disclosure relates to a cellulose acetate resin composition for use in melt molding.

BACKGROUND ART

Cellulose acetate has biodegradability and is known to degrade by activated sludge. There has been a demand for biodegradable molded articles, in particular, films and sheets due to growing interest in global environment.

Cellulose acetate has poor heat meltability due to hydrogen bonding resulting from hydroxyl groups remaining in a molecular chain thereof. A melting temperature of cellulose acetate tends to be higher as its total degree of acetyl substitution DS is lower. On the other hand, as the total degree of acetyl substitution of cellulose acetate is higher, crystallinity thereof is higher, and thus the solubility and meltability thereof tend to decrease. Various methods for forming cellulose acetate into a sheet or film through film formation by melting have been investigated.

Patent Document 1 discloses a biodegradable sheet formed from an acetate composition containing cellulose acetate and polyoxyethylene glycol. Patent Document 2 discloses a biodegradable film or sheet including cellulose acetate having a degree of acetyl group substitution from 2.3 to 2.7 and a biodegradable plasticizer as main components. This plasticizer is selected from the group consisting of (1) a compound represented by $H_5C_3(OH)_{3-n}(OOCCH_3)_n$ (0≤n≤3) and (2) a glycerin alkylate, an ethylene glycol alkylate, a polyethylene glycol alkylate having an ethylene repeating unit of 5 or less, an aliphatic monocarboxylic acid alkyl ester, an aliphatic dicarboxylic acid alkyl ester, and an aliphatic tricarboxylic acid alkyl ester.

Patent Document 3 proposes a cellulose acetate-based resin composition obtained by melting and mixing a cellulose acetate having a weight average molecular weight of 100,000 to 250,000 and an average degree of substitution from 1.0 to 2.5, and a plasticizer having an average molecular weight of 300 or greater, the composition including a region having a glass transition temperature of 200° C. or higher. Patent Document 4 discloses a water-soluble cellulose acetate-based resin composition including a cellulose acetate having a total degree of acetyl substitution from 0.5 to 1.0 and a water-soluble organic additive.

Patent Document 5 discloses a technique for improving the biodegradability of a polymer such as cellulose ester by adding, in the polymer, a basic additive of which a 1% aqueous solution (20° C.) has a pH of 13 or less and 7 or greater.

CITATION LIST

Patent Document

Patent Document 1: JP 8-53575 A
Patent Document 2: JP 2002-60545 A
Patent Document 3: JP 11-255959 A
Patent Document 4: JP 2015-140432 A
Patent Document 5: JP 2018-500416 T

SUMMARY OF DISCLOSURE

Technical Problems

All the compositions disclosed in Patent Documents 1 to 3 are melt molded at a temperature above 200° C. and provide a sheet having a thickness of more than 100 μm. A melting temperature above 200° C. causes a problem of coloration caused by thermal decomposition of cellulose acetate. The resin composition of Patent Document 4 is melt-spun at a temperature of 200° C. or lower, but includes a cellulose acetate having a low degree of substitution.

According to the findings of the present inventors, a resin composition including a cellulose acetate having a relatively high degree of substitution has insufficient melt fluidity at a temperature lower than 200° C., and provides inadequate elongation and bending flexibility of a melt, thereby making it difficult to form, in particular, a thin film having a thickness of 100 μm or less.

The polymer composition of Patent Document 5 is used mainly in film formation by a casting method, and this patent document does not refer to film formation by melting. In the related art, it has been pointed out that a resin composition including an inorganic substance such as a basic substance has a high melting temperature, and thus involves various problems such as thermal decomposition of cellulose acetate and deterioration in hue associated therewith, occurrence of a side reaction with an additive such as the inorganic substance, and poor film formation due to a decrease in melt tension.

As described above, it is known that cellulose acetate is degraded in activated sludge, but there is also a problem that no satisfactory degradation rate can be obtained in a water system having a smaller number of bacteria than that in activated sludge, for example, in seawater.

An object of the present disclosure is to provide a cellulose acetate resin composition that can provide a molded article having excellent marine biodegradability by melt molding.

Solution to Problems

The cellulose acetate resin composition according to an embodiment of the present disclosure includes a cellulose acetate (A) having a total degree of acetyl substitution of 2.60 or less; a filler (B); and a plasticizer (C). The filler (B) is one type or two or more types selected from the group consisting of (b1) to (b4) below:
  (b1) an inorganic compound containing an oxygen atom that binds to any metal element of Na, K, Ca, or Mg,
  (b2) a metal salt containing one or more types of metal ions selected from $Na^+$, $K^+$, $Ca^{2+}$, or $Mg^{2+}$ and one or more types of anions selected from a carbonate ion, a bicarbonate ion, a silicate ion, or an aluminate ion,
  (b3) cellulose or hemicellulose, and
  (b4) wood flour.

The plasticizer (C) is one type or two or more types selected from the group consisting of (c1) to (c3) below:
  (c1) a glycerin ester-based plasticizer in which at least one hydroxyl group of glycerin is esterified,
  (c2) an ether-based plasticizer in which at least one terminal hydroxyl group of polyalkylene glycol is etherified, and (c3) a glycol ester-based plasticizer in which at least one terminal hydroxyl group of polyalkylene glycol is esterified.

A content of the cellulose acetate (A) is 45 mass % or greater and 90 mass % or less, a total content of the filler (B) is 5 mass % or greater and 50 mass % or less, and a total content of the plasticizer (C) is 5 mass % or greater and 35 mass % or less, with respect to a total of the resin composition.

Preferably, a total content of the cellulose acetate (A), the filler (B), and the plasticizer (C) in the resin composition is 85 mass % or greater.

A preferred glycerin ester-based plasticizer (c1) is a glycerin acetate having a degree of acetyl substitution of 0 or greater and 3 or less.

A preferred ether-based plasticizer (c2) is a polyalkylene glycol in which an average degree of substitution of the terminal hydroxyl group esterified with a hydrocarbon group having a molecular weight of 150 or less is 0 or greater and 2 or less. The polyalkylene glycol has an alkyleneoxy group having 2 or greater and 4 or less carbon atoms as a repeating unit, and has a degree of polymerization of 23 or less.

A preferred glycol ester-based plasticizer (c3) is a polyalkylene glycol in which an average degree of substitution of the terminal hydroxyl group esterified with a carboxylic acid having a molecular weight of 150 or less is 0 or greater and 2 or less. The polyalkylene glycol has an alkyleneoxy group having 2 or greater and 4 or less carbon atoms as a repeating unit, and has a degree of polymerization of 23 or less.

Preferably, a sulfuric acid component amount of the cellulose acetate (A) is 350 ppm or less.

Preferably, the cellulose acetate has a total degree of acetyl substitution of 2.0 or greater and 2.60 or less.

From another perspective, an embodiment of the present disclosure is a melt-molded body obtained using any of the cellulose acetate resin compositions described above. Preferably, the present disclosure is an injection-molded article obtained using any of the resin compositions described above. Preferably, the present disclosure is a film or sheet obtained using any of the resin compositions described above.

Advantageous Effects of Disclosure

The cellulose acetate resin composition according to an embodiment of the present disclosure includes a predetermined amount of the filler (B), and thus has excellent marine biodegradability. Furthermore, the resin composition further includes a predetermined amount of the plasticizer (C), and thus can be melt molded in a relatively low temperature region although it contains the filler (B). Furthermore, the resin composition provides high melt tension, and thus can also be applied to injection molded articles, in particular, films.

DESCRIPTION OF EMBODIMENTS

The present disclosure will be described in detail below based on preferable embodiments. The scope of the present disclosure is not limited to these descriptions, and the present disclosure can be appropriately changed and implemented within a range not impairing the gist of the present disclosure, in addition to the following examples. In addition, the present disclosure is not limited to the following embodiments, and various modifications can be made within the scope described in claims. Other embodiments obtained by appropriately combining the technical means disclosed for each of the plurality of embodiments are also included in the technical scope of the present disclosure.

In the present specification, "from X to Y" indicating a range means "X or greater and Y or less". Also, unless otherwise noted, "ppm" means "ppm by weight" or "ppm by mass". Furthermore, "weight" and "mass", "parts by weight" and "parts by mass", and "wt. %" and "mass %" are each treated as synonyms.

[Cellulose Acetate Resin Composition]

The cellulose acetate resin composition according to some embodiments of the present disclosure includes cellulose acetate (A); a filler (B); and a plasticizer (C). Preferably, the cellulose acetate (A) has a total degree of acetyl substitution of 2.60 or less. The filler (B) is one type or two or more types selected from the group consisting of:

(b1) an inorganic compound containing an oxygen atom that binds to any metal element of Na, K, Ca, or Mg;
(b2) a metal salt containing one or more types of metal ions selected from $Na^+$, $K^+$, $Ca^{2+}$, or $Mg^{2+}$ and one or more types of anions selected from a carbonate ion, a bicarbonate ion, a silicate ion, or an aluminate ion,
(b3) cellulose or hemicellulose, and
(b4) wood flour. The plasticizer (C) is one type or two or more types selected from the group consisting of:
(c1) a glycerin ester-based plasticizer in which at least one hydroxyl group of glycerin is esterified,
(c2) an ether-based plasticizer in which at least one terminal hydroxyl group of polyalkylene glycol is etherified, and
(c3) a glycol ester-based plasticizer in which at least one terminal hydroxyl group of polyalkylene glycol is esterified. In the resin composition, a content of the cellulose acetate (A) is 45 mass % or greater and 90 mass % or less, a total content of the filler (B) is 5 mass % or greater and 50 mass % or less, and a total content of the plasticizer (C) is 5 mass % or greater and 35 mass % or less.

In the resin composition, the filler (B) selected from the above-described (b1) to (b4) is blended in an amount of 5 mass % or greater and 50 mass % or less. The resin composition is excellent in biodegradability, particularly, biodegradability in seawater. In the resin composition, the plasticizer selected from the above-described (c1) to (c3) is blended in an amount of 5 mass % or greater and 35 mass % or less, together with the filler (B). The plasticizer (c) has high compatibility with the cellulose acetate (A) having a total degree of acetyl substitution of 2.60 or less. Due to the blending of the plasticizer (C), the resin composition can be melt molded at a temperature lower than a thermal decomposition temperature of the cellulose acetate, specifically, at lower than 200° C. although it contains the filler (B), and coloration caused by pyrolysis can be avoided.

In the resin composition, it is considered that the plasticizer (C) in which the terminal hydroxyl group is etherified or esterified exhibits an effect of improving entanglement between molecular chains of the cellulose acetate (A) at the time of melting. Therefore, the resin composition has low melt viscosity and high melt tension in a temperature region of lower than 200° C. Due to the low melt viscosity and the high melt tension, the resin composition enables not only film formation by melting, but also further stretching of the formed film into a thin film. Furthermore, film formation by an inflation method in the art, which is difficult to be applied to cellulose acetate, can be realized.

From the perspective of providing excellent biodegradability, the total content of the cellulose acetate (A), the filler (B), and the plasticizer (C) in the resin composition is preferably 85 mass % or greater, more preferably 90 mass % or greater, and particularly preferably 9.5 mass % or greater. An upper limit of the total content is not particularly limited, and may be 100 mass %.

[Filler (B)]

One type or two or more types of the fillers (B) selected from the group consisting of (b1) to (b4) below are blended in the resin composition according to the present disclosure:

(b1) an inorganic compound containing an oxygen atom that binds to any metal element of Na, K, Ca, or Mg,
(b2) a metal salt containing one or more types of metal ions selected from $Na^+$, $K^+$, $Ca^{2+}$, or $Mg^{2+}$ and one or more types of anions selected from a carbonate ion, a bicarbonate ion, a silicate ion, or an aluminate ion,
(b3) cellulose or hemicellulose, and
(b4) wood flour.

In particular, the resin composition including the filler (B) selected from the inorganic compound (b1) and the metal salt (b2) is remarkably improved in biodegradability in seawater. This is considered to be because the inorganic compound (b1) and the metal salt (b2) exhibit basicity in seawater, thereby promoting hydrolysis of the cellulose acetate. From this perspective, a resin composition including at least one type selected from (b1) and (b2) as the filler (B) is preferred.

The total content of the filler (B) in the resin composition of the present disclosure is 5 mass % or greater and 50 mass % or less with respect to the total of the resin composition. From the perspective of improving biodegradability in seawater, the total content of the filler (B) is preferably 10 mass % or greater, and more preferably 15 mass % or greater. From the perspective of achieving excellent melt moldability, the total content of the filler (B) is preferably 45 mass % or less, and more preferably 40 mass % or less. The total content of the filler (B) in the resin composition of the present disclosure may be from 5 to 45 mass %, may be from 5 to 40 mass %, may be from 10 to 50 mass %, from 10 to 45 mass %, may be from 10 to 40 mass %, may be from 15 to 50 mass %, may be from 15 to 45 mass %, and may be from 15 to 40 mass %. When a plurality of the fillers (B) are used in combination, a total amount thereof is adjusted to the above-described numerical range.

Examples of the inorganic compound (b1) containing an oxygen atom that binds to any metal element of Na, K, Ca, or Mg include oxides, hydroxides, and composite oxides of any metal element of Na, K, Ca, or Mg. From the perspective of improving biodegradability and ease of handling, the inorganic compound (b1) is preferably magnesium oxide, magnesium hydroxide, talc, hydrotalcite, bentonite, calcium oxide, and calcium hydroxide.

Specific examples of the metal salt (b2) containing one or more types of metal ions selected from $Na^+$, $K^+$, $Ca^{2+}$, or $Mg^{2+}$ and one or more types of anions selected from a carbonate ion, a bicarbonate ion, a silicate ion, or an aluminate ion include sodium carbonate, potassium carbonate, calcium carbonate, magnesium carbonate, sodium bicarbonate, potassium bicarbonate, calcium bicarbonate, magnesium bicarbonate, calcium silicate, magnesium silicate, magnesium aluminate, and magnesium aluminometasilicate. From the perspective of providing high biodegradability and excellent moldability, preferable metal salts (b2) are calcium carbonate, magnesium carbonate, calcium silicate, magnesium silicate, magnesium aluminate, and magnesium aluminometasilicate.

The cellulose and hemicellulose (b3) are not particularly limited, and known ones can be appropriately used. Fine cellulose and hemicellulose are preferred, from the perspective of achieving excellent melt kneadability. The cellulose and hemicellulose (b3) may be in the form of a powder or a fiber. In the form of a powder, the cellulose and hemicellulose (b3) preferably have an average particle size (median diameter) of 10 μm or greater and 200 μm or less measured by a microtrac particle size analyzer.

As the wood flour (b4), one obtained by pulverization of known wood material can be used. From the perspective of achieving excellent melt kneadability, an average particle size (median diameter) of the wood flour is preferably 10 μm or greater and 200 μm or less. The average particle size (median diameter) of the wood flour is measured by a microtrac particle size analyzer.

[Plasticizer (C)]

One type or two or more types of the plasticizers (C) selected from the group consisting of (c1) to (c3) below are blended in the resin composition according to the present disclosure:

(c1) a glycerin ester-based plasticizer in which at least one hydroxyl group of glycerin is esterified,
(c2) an ether-based plasticizer in which at least one terminal hydroxyl group of polyalkylene glycol is esterified, and
(c3) a glycol ester-based plasticizer in which at least one terminal hydroxyl group of polyalkylene glycol is esterified.

A resin composition including at least one type selected from the ether-based plasticizer (c2) and the glycol ester-based plasticizer (c3) as the plasticizer (C) is preferred, from the perspective of achieving a melting temperature lower than the degradation temperature of the cellulose acetate.

The total content of the plasticizer (C) in the resin composition of the present disclosure is 5 mass % or greater and 35 mass % or less, with respect to the total of the resin composition. From the perspective of achieving high melt fluidity, the total content of the plasticizer (C) is preferably 7 mass % or greater, and more preferably 9 mass % or greater. From the perspective of providing a low melt viscosity at lower than 200° C. the total content of the plasticizer (C) is preferably 33 mass % or less. The total content of the plasticizer (C) in the resin composition of the present disclosure may be from 5 to 33 mass %, from 7 to 35 mass %, from 7 to 33 mass %, from 9 to 35 mass %, and from 9 to 33 mass %. When a plurality of the plasticizers (C) are used in combination, a total amount thereof is adjusted to the above-described numerical range.

The glycerin ester-based plasticizer (c1) is a compound in which at least one hydroxyl group of glycerin is esterified, and is a compound esterified with a carboxylic acid having preferably a molecular weight of 150 or less and more preferably a molecular weight of 130 or less.

The carboxylic acid may be an aliphatic carboxylic acid (fatty acid) or an aromatic carboxylic acid. From the perspective of reducing environmental load, a fatty acid is preferable. The fatty acid may be a saturated fatty acid or an unsaturated fatty acid. The glycerin ester-based plasticizer is preferably an ester-based plasticizer that is esterified with a saturated fatty acid. Specific examples of the saturated fatty acid include formic acid, acetic acid, propionic acid, and butyric acid. A particularly preferred glycerin ester-based plasticizer (c1) is a glycerin acetate having a degree of acetyl substitution of 0 or greater and 3 or less.

The ether-based plasticizer (c2) is a compound in which at least one terminal hydroxyl group of polyalkylene glycol is etherified, and is a compound etherified with a hydrocarbon group having a molecular weight of preferably 150 or less, more preferably 130 or less, and particularly preferably 100 or less. An average degree of substitution of the terminal hydroxyl group of the etherified polyalkylene glycol may be 0 or greater and 2 or less.

The hydrocarbon group may be linear, branched, or cyclic. An aliphatic hydrocarbon group is preferable, and a saturated aliphatic hydrocarbon group (alkyl group) is more preferable. Examples of the alkyl group having a molecular weight of 150 or less include a methyl group, an ethyl group, and a propyl group.

In the ether-based plasticizer (c2), the polyalkylene glycol has an alkyleneoxy group as a repeating unit. From the perspective of suppressing degradation during melting, a number of carbon atoms of the alkyleneoxy group as the repeating unit is preferably 2 or greater. From the perspective of improving compatibility with the cellulose acetate (A), the number of carbon atoms is preferably 4 or less. Examples of such an alkyleneoxy group include an ethyleneoxy group, a propyleneoxy group, and a butyleneoxy group.

From the perspective of providing high melt tension, a number of the repeating units (hereinafter referred to as degree of polymerization) in the polyalkylene glycol is preferably 2 or greater, and more preferably 3 or greater. From the perspective of achieving excellent compatibility with the cellulose acetate (A), a preferred degree of polymerization is 23 or less, and more preferably 15 or less.

From the perspective of achieving excellent compatibility with the cellulose acetate (A), the ether-based plasticizer (c2) has a number average degree of polymerization of preferably 23 or less, and more preferably 15 or less. An ether-based plasticizer (c2) having a number average degree of polymerization of 3 or greater is preferred, from the perspective of providing high melt tension. The number average degree of polymerization of the ether-based plasticizer (c2) is calculated from the number average molecular weight measured by size exclusion chromatography (GPC) using polystyrene as a standard substance.

Specific examples of the ether-based plasticizer (c2) used in the resin composition of the present disclosure include diethylene glycol monomethyl ether, diethylene glycol dimethyl ether, diethylene glycol monoethyl ether, diethylene glycol diethyl ether, triethylene glycol monomethyl ether, triethylene glycol dimethyl ether, triethylene glycol dibutyl ether, tetraethylene glycol monomethyl ether, tetraethylene glycol dimethyl ether, tetraethylene glycol diethyl ether, polyethylene glycol monomethyl ether, polyethylene glycol monoethyl ether, and polypropylene glycol monomethyl ether.

The glycol ester-based plasticizer (c3) is a compound in which at least one terminal hydroxyl group of polyalkylene glycol is esterified, and is a compound esterified with a carboxylic acid having a molecular weight of preferably 150 or less, more preferably 130 or less, and particularly preferably 100 or less. An average degree of substitution of the terminal hydroxyl group of the esterified polyalkylene glycol may be 0 or greater and 2 or less.

The carboxylic acid may be an aliphatic carboxylic acid (fatty acid) or an aromatic carboxylic acid. From the perspective of reducing environmental load, a fatty acid is preferable. The fatty acid may be a saturated fatty acid or an unsaturated fatty acid. Preferably, the glycol ester-based plasticizer (c3) is esterified with a saturated fatty acid. Specific examples of the saturated fatty acid include formic acid, acetic acid, propionic acid, and butyric acid.

In the glycol ester-based plasticizer (c3), the polyalkylene glycol has an alkyleneoxy group as a repeating unit. From the perspective of suppressing degradation during melting, a number of carbon atoms of the alkyleneoxy group as the repeating unit is preferably 2 or greater. From the perspective of achieving excellent compatibility with the cellulose acetate (A), the number of carbon atoms is preferably 4 or less. Examples of such an alkyleneoxy group include an ethyleneoxy group, a propyleneoxy group, and a butyleneoxy group.

From the perspective of providing high melt tension, a number of the repeating units (degree of polymerization) in the polyalkylene glycol is preferably 2 or greater, and more preferably 3 or greater. From the perspective of achieving excellent compatibility with the cellulose acetate (A), a preferred degree of polymerization is 23 or less, and more preferably 15 or less.

From the perspective of suppressing volatilization during melting and improving the melt tension, the number average molecular weight of the glycol ester-based plasticizer (c3) is preferably 200 or greater. From the perspective of achieving excellent compatibility with the cellulose acetate (A), a glycol ester-based plasticizer (c3) having a number average molecular weight of 1000 or less is preferred. The number average molecular weight of the glycol ester-based plasticizer (c3) is measured by size exclusion chromatography (GPC) using polystyrene as a standard substance.

Specific examples of the glycol ester-based plasticizer (c3) used in the resin composition of the present disclosure include triethylene glycol monoacetate, triethylene glycol diacetate, triethylene glycol dipropionate, triethylene glycol dibenzoate, and tetraethylene glycol diacetate.

[Cellulose Acetate (A)]

The cellulose acetate (A) having a total degree of acetyl substitution (DS) of 2.60 or less is used in the resin composition of the present disclosure. From the perspective of improving biodegradability, the total degree of acetyl substitution of the cellulose acetate (A) is preferably 2.56 or less, and more preferably 2.50 or less. From the perspective of achieving high water resistance, the total degree of acetyl substitution of the cellulose acetate (A) is preferably 2.0 or greater, and more preferably 2.1 or greater. Preferably, the cellulose acetate (A) having a total degree of acetyl substitution of 2.0 or greater and 2.60 or less is preferred. The total degree of acetyl substitution of the cellulose acetate (A) may be from 2.0 to 2.56, from 2.0 to 2.50, from 2.1 to 2.60, from 2.1 to 2.56, and from 2.1 to 2.50.

The total degree of acetyl substitution (DS) of the cellulose acetate (A) is determined by converting a combined acetic acid content AV determined in accordance with the method for measuring the combined acetic acid content in ASTM:D-871-96 (Testing methods for cellulose acetate, etc.). This is the most common procedure to determine the degree of substitution of cellulose acetate.

$$DS=162.14 \times AV \times 0.01/(60.052-42.037 \times AV \times 0.01)$$

DS: Total degree of acetyl substitution

AV: Combined acetic acid content (%)

The method for measuring the combined acetic acid content (AV) is as follows.

First, 500 mg of a dried cellulose acetate (sample) is precisely weighed and dissolved in 50 ml of a mixed solvent of ultrapure water and acetone (volume ratio: 4:1), and then 50 ml of a 0.2 N aqueous sodium hydroxide solution is added to saponify the cellulose acetate at 25° C. for 2 hours. Next, 50 ml of 0.2 N hydrochloric acid is added, and an amount of acetic acid released is titrated with a 0.2 N aqueous sodium hydroxide solution (0.2 N normal sodium hydroxide solution) using phenolphthalein as an indicator. Also, a blank test (test without using any sample) is performed by the same method. AV (combined acetic acid content) (%) is then calculated according to the following equation:

$$AV(\%) = (A-B) \times F \times 1.201 / \text{sample mass (g)}$$

wherein
A represents a titration volume (ml) of 0.2 N normal sodium hydroxide solution;
B represents a titration volume (ml) of 0.2 N normal sodium hydroxide solution in blank test; and
F represents a factor of 0.2 N normal sodium hydroxide solution.

[Degrees of Acetyl Substitution at 2-, 3- and 6-Positions]

In the resin composition of the present disclosure, a cellulose acetate (A) in which a degree of acetyl substitution at 2-position C2, a degree of acetyl substitution at 3-position C3, and a degree of acetyl substitution at 6-position satisfy the following mathematical equation is preferred:

$$(C2+C3)/2 > C6$$

A cellulose acetate (A) in which the total degree of acetyl substitution satisfies the range described above and the degrees of acetyl substitution at 2-, 3-, and 6-positions satisfy the mathematical equation is excellent in biodegradability. In the present specification, the degrees of acetyl substitution at 2-, 3- and 6-positions are measured by $^{13}$C-NMR.

[Viscosity-Average Degree of Polymerization (DPv) of Cellulose Acetate (A)]

A viscosity-average degree of polymerization (DPv) of the cellulose acetate used in the resin composition of the present disclosure is not particularly limited, but is preferably 10 or greater and 400 or less. A resin composition including a cellulose acetate (A) having a viscosity-average degree of polymerization within this range is excellent in melt moldability. From this perspective, the viscosity-average degree of polymerization is more preferably 15 or greater and 300 or less, and even more preferably 20 or greater and 200 or less.

The viscosity-average degree polymerization (DPv) is determined based on a limiting viscosity number ([η], m$^3$/g) of the cellulose acetate (A).

The limiting viscosity number ([η], unit: cm$^3$/g) is determined in accordance with JIS-K-7367-1 and ISO 1628-1. Specifically, the limiting viscosity number is determined by preparing a sample solution in which dimethyl sulfoxide (DMSO) is used as a solvent, measuring the logarithmic relative viscosity at 25° C. using an Ubbelohde-type viscometer of size number 1C, and dividing the logarithmic relative viscosity at 25° C. by the concentration of the sample solution.

Using the obtained limiting viscosity number [η], the viscosity-average molecular weight is calculated by the following equation in accordance with the literature of Kamide et al. (Polymer Journal, 13, 421-431 (1981)).

Viscosity-average molecular weight=(limiting viscosity number [η]/0.171)(1/0.61)

Using the calculated viscosity-average molecular weight, the viscosity-average degree of polymerization (DPv) was determined by the following equation.

Viscosity-average degree of polymerization (DPv)
=viscosity–average molecular weight/(162.14+ 42.037×DS)

In the equation, DS is the total degree of acetyl substitution described above.

[Weight-Average Degree of Polymerization (DPw)]

A weight-average degree of polymerization (DPw) of the cellulose acetate (A) is preferably in a range from 10 to 400. The weight-average degree of polymerization (DPw) is preferably from 15 to 300, and more preferably from 20 to 200, from the perspective of improving fluidity during melting.

The weight-average degree of polymerization (DPw) of the cellulose acetate (A) can be determined by a known method. Specifically, the weight-average degree of polymerization (DPw) of the cellulose acetate (A) is determined by performing size exclusion chromatography (GPC) measurement using the following apparatus under the following conditions (GPC-light scattering method).

Apparatus: "SYSTEM-21H", GPC available from Shodex
Solvent: acetone
Column: two GMHxl (Tosoh Corporation), guard column (TSK gel guard column HXL-H available from Tosoh Corporation)
Flow rate: 0.8 ml/min.
Temperature: 29° C.
Sample concentration: 0.25% (wt/vol)
Injection volume: 100 µl
Detection: MALLS (multi-angle light scattering detector) ("DAWN-EOS" available from Wyatt Technology Corporation)
Reference material for MALLS calibration: PMMA (molecular weight: 27600)

[Sulfuric Acid Component Amount of Cellulose Acetate (A)]

From the perspective of suppressing coloration during melt molding, a sulfuric acid component amount of the cellulose acetate (A) is preferably 350 ppm or less, more preferably 300 ppm or less, and particularly preferably 250 ppm or less. A smaller sulfuric acid component amount is more preferred, but a lower limit thereof is 30 ppm. Note that, in the present specification, the sulfuric acid component is a concept including combined sulfuric acid, free sulfuric acid, and a sulfate salt contained in cellulose acetate (A), the sulfate salt being produced through neutralization by addition of base. The combined sulfuric acid includes a sulfate group that is ester-bonded to the cellulose acetate (A), and a sulfuric acid component bonded as a sulfonic group.

The sulfuric acid component amount is determined by heating the cellulose acetate (A) at 1300° C., trapping the sublimed sulfurous acid gas in 10% hydrogen peroxide water, titrating the trapped sulfurous acid gas with an aqueous sodium hydroxide solution, and then converting the amount of the trapped sulfurous acid gas into a sulfuric acid amount.

[Content of Cellulose Acetate (A)]

The content of the cellulose acetate (A) in the resin composition of the present disclosure is 45 mass % or greater and 90 mass % or less, with respect to the total of the resin composition. From the perspective of obtaining good shapability, the content of the cellulose acetate (A) is preferably 50 mass % or greater. From the perspective of obtaining high melt fluidity, the content of the cellulose acetate (A) is preferably 80 mass % or less. The content of the cellulose acetate (A) in the resin composition of the present disclosure may be from 4.5 to 80 mass %, from 50 to 90 mass %, and from 50 to 80 mass %. When two or more types of the cellulose acetate (A) are used in combination, a total amount thereof is adjusted to the above-described numerical range.

[Method for Producing Cellulose Acetate (A)]

The cellulose acetate having a total degree of acetyl substitution of 2.60 or less can be produced by a known method for producing cellulose acetate. Examples of such a production method include what is called an acetic acid method in which acetic anhydride is used as an acetylating agent, acetic acid as a diluent, and sulfuric acid as a catalyst. The basic processes of the acetic acid method include: (1) pretreatment including grinding/disintegrating a pulp raw material (soluble pulp) having a relatively high α-cellulose content and then spraying acetic acid and mixing them; (2) acetylation including reacting the pretreated pulp from (1) with a mixed acid containing acetic anhydride, acetic acid, and an acetylation catalyst (e.g., sulfuric acid); (3) aging including hydrolyzing cellulose acetate to form cellulose acetate having a desired combined acetic acid content; and (4) post-treatment including precipitating the cellulose acetate to separate it from the reaction solution after completion of the hydrolysis reaction, then purifying, stabilizing, and drying the cellulose acetate. The total degree of acetyl substitution can be adjusted by adjusting the conditions of aging (conditions, such as time and temperature).

[Method for Producing Resin Composition]

The resin composition of the present disclosure can be obtained by melt kneading the cellulose acetate (A) having a total degree of acetyl substitution of 2.60 or less, the filler (B) described above, and the plasticizer (C) described above. Preferably, the resin composition is obtained by mixing the cellulose acetate (A), the filler (B), and the plasticizer (C), and then melt kneading the mixture. Because of mixing before melt kneading, the filler (B), the plasticizer (C) and the cellulose acetate (A) are more homogeneously mixed with each other in a short time to homogenize the resulting kneaded product, and thus a resin composition with improved melt fluidity and processing accuracy is obtained.

A known mixer such as a Henschel mixer can be used for mixing the cellulose acetate (A), the filler (B) and the plasticizer (C). Dry mixing or wet mixing may be used. In using a mixer such as a Henschel mixer, the temperature inside the mixer is preferably a temperature at which the cellulose acetate (A) does not melt, for example, in a range of 20° C. or higher and lower than 200° C.

An extruder such as a twin-screw extruder can be used for melt kneading of the cellulose acetate (A), the filler (B), and the plasticizer (C) or melt kneading after mixing of the cellulose acetate (A), the filler (B), and the plasticizer (C). From the perspective of homogeneity of the kneaded product and suppression of deterioration due to heating, the kneading temperature (cylinder temperature) of the extruder is preferably 170° C. or higher and 230° C. or lower. A melting point of the cellulose acetate (A) is approximately from 230° C. to 280° C. depending on the degree of substitution, and is close to the degradation temperature of the cellulose acetate (A), and thus it is usually difficult to perform melt kneading in this temperature range. However, a plasticizing temperature of the resin composition of the present disclosure is lowered by the plasticizer (C), and thus a sufficiently homogeneous kneaded product can be obtained at a temperature of 230° C. or lower even when a predetermined amount of the filler (B) is contained. For example, when melt kneading is performed using a twin-screw extruder, the kneading temperature (also referred to as cylinder temperature) may be 200° C. The kneaded product may be extruded into a strand shape from a die attached to the tip of the twin-screw extruder and then hot-cut into pellets. Here, the die temperature may be approximately 220° C.

A blending amount of the filler (B) with respect to the total of the resulting resin composition is 5 mass % or greater and 50 mass % or less. When two or more types of the fillers (B) are blended, the total amount thereof is adjusted to 5 mass % or greater and 50 mass % or less.

The blending amount of the plasticizer (C) with respect to the total of the resulting resin composition is 5 mass % or greater and 35 mass % or less. When two or more types of the plasticizers (C) are blended, the total amount thereof is adjusted to 5 mass % or greater and 35 mass % or less.

As long as the effects of the present disclosure are not inhibited, a plasticizer other than the plasticizer described above may be blended in the resin composition. A known additive such as a colorant, an ultraviolet absorber, a light stabilizer, an antioxidant, a heat stabilizer, an optical property modifier, a fluorescent brightener, and a flame retardant may be blended. In that case, it is preferable to attain a total content of the cellulose acetate (A), the filler (B), and the plasticizer (C) of 85 mass % or greater in the resin composition.

[Melt-Molded Body]

From another perspective, an embodiment of the present disclosure relates to a melt-molded body using the cellulose acetate resin composition described above. A molded body obtained by melt-molding the resin composition of the present disclosure is not colored due to a thermal decomposition product, and additionally, has high marine biodegradability.

[Injection-Molded Article]

From still another perspective, an embodiment of the present disclosure relates to an injection-molded article using the cellulose acetate resin composition described above. The resin composition of the present disclosure having excellent fluidity during melting can be suitably applied to injection molding. Preferably, an embodiment of the present disclosure relates to a film or sheet using the cellulose acetate resin composition described above. In particular, a film obtained by using the resin composition of the present disclosure having high melt tension in a film formation method by melting, which has been difficult, is thin and uniform. Preferably, the film has a thickness of less than 100 μm, and more preferably 10 μm or greater and 90 μm or less. As will be described below, the use of a stretching or inflation method after melt extrusion makes it possible to reduce the thickness of the film to 10 μm or greater and 50 μm or less, and further 10 μm or greater and 30 μm or less, depending on the application.

[Film Formation Method]

The film of the present disclosure is produced by a film formation method by melting, without using a solvent having a great environmental load. In particular, the film is formed by melting the resin composition of the present disclosure under heating, and extruding the resulting melt through a press or T-die. The melting temperature is preferably 210° C. or lower, more preferably 200° C. or lower, and even more preferably 190° C. or lower. From the perspective of ease of film formation, a preferred melting temperature is 160° C. or higher.

For example, an unstretched film is obtained by extruding a melt through a T-die onto a roll adjusted to a predetermined temperature using a known melt extruder, and solidifying the extruded melt. The changes of the melting temperature and a die lip adjust the film thickness. By increasing a roll speed after die extrusion, a thinner stretched film can be obtained.

The film of the present disclosure may be obtained by the inflation method. In the inflation method, a film can be formed into a tubular shape. By melt-cutting this tube with a melt cutting seal, a bag with a handle can be easily formed.

An inflation film obtained using the resin composition of the present disclosure is excellent in biodegradability, particularly, marine biodegradability. This inflation film may be used as a shopping bag or garbage bag with a low environmental load.

The resin composition according to the present disclosure can be suitably used as base materials for, for example, tableware, packaging containers, trays, agricultural materials, fishery materials, OA parts, home electric appliance parts, automobile members, daily goods, and stationery.

EXAMPLES

The effects of the present disclosure will be clarified by the examples below, but the present disclosure should not be construed as being limited based on the description of the examples.

Example 1

70 parts by mass of cellulose acetate (available from Daicel Corporation: total degree of acetyl substitution DS=2.46, sulfuric acid component amount: 200 ppm), 20 parts by mass of calcium carbonate (available from FUJIFILM Wako Pure Chemical Corporation) as a filler, and 30 parts by mass of triethylene glycol diacetate (available from TCI, molecular weight: 234.3) as a plasticizer were blended in a dry state, dried at 80° C. for 3 hours or longer, and further stirred and mixed using a Henschel mixer to obtain a mixture of the cellulose acetate, the filler, and the plasticizer. The resulting mixture was fed to a twin-screw extruder (trade name "PCM30" available from Ikegai Corporation, cylinder temperature: 180° C., die temperature: 180° C.), melt-kneaded, and extruded into a strand shape, the strand-shaped product was hot-cut, and pellets were obtained.

Examples 2 to 47 and Comparative Examples 2, 3 and 5 to 19

Melt extrusion was performed in the same manner as in Example 1, with the exception that the resin composition had a composition indicated in Tables 1 to 6.

Comparative Examples 1 and 4

In Comparative Examples 1 and 4, the cellulose acetate indicated in Table 5 was directly subjected to a seawater biodegradation test which will be described below, without melt kneading.

[Evaluation of Moldability]

Examples 1 to 47 and Comparative Examples 2, 3 and 5 to 19 were ranked according to the following criteria, based on the presence or absence of an excessive torque increase during melt extrusion and the presence or absence of coloration of the resulting pellets. The evaluation results are indicated in Tables 1 to 6 below.

A: Pelletization is possible, and no coloration is observed.
B: Pelletization is possible, but coloration is observed.
C: Pelletization is not possible due to a torque increase during extrusion.

[Evaluation of Degree of Biodegradation in Seawater]

The degree of biodegradation in seawater was evaluated for Examples 1 to 36 and Comparative Examples 2, 3, 5 and 6 having moldability evaluated as A, and Comparative Examples 1 and 4. Examples 1 to 36 and Comparative Examples 2, 3, 5, and 6 were melt extruded to obtain the pellets, the obtained pellets were each pulverized to an average particle size of approximately 20 μm, and were subjected to the following biodegradation test. Comparative Examples 1 and 4 were directly subjected to the following biodegradation test as controls without melt kneading. The cellulose acetates of Comparative Examples 1 and 4 were each a powder having an average particle size of 20 μm.

60 mg of each sample was added into 250 of seawater, and stirred at a temperature of 30° C. The amount of carbon dioxide generated was measured 90 days and 120 days after the sample was added. The theoretical amount of carbon dioxide generated was calculated from the total organic carbon amount (TOC) measured for each sample subjected to the test, and the ratio of the value obtained by subtracting the measured value of the blank (seawater only) from the measured value to the theoretical amount of carbon dioxide generated was taken as the degree of biodegradation in seawater (%) The obtained results are indicated in Tables 1 to 5 below.

TABLE 1

| | Composition | | | | | | | | Degree of biodegradation in seawater | |
|---|---|---|---|---|---|---|---|---|---|---|
| | CA | | | Plasticizer | | Filler | | | After | After |
| | Degree of substitution | Sulfuric acid (ppm) | mass % | Type | mass % | Type | mass % | Moldability | 90 days (%) | 120 days (%) |
| Example 1 | 2.46 | 200 | 58.3 | Triethylene glycol diacetate | 25.0 | CaCO3 | 16.7 | A | 63.6 | 84.8 |
| Example 2 | 2.46 | 200 | 58.3 | Triethylene glycol diacetate | 25.0 | Wood flour | 16.7 | A | 61.7 | 78.0 |
| Example 3 | 2.46 | 200 | 58.3 | Triethylene glycol diacetate | 25.0 | Cellulose powder | 16.7 | A | 61.6 | 78.3 |
| Example 4 | 2.46 | 200 | 58.3 | Triethylene glycol diacetate | 25.0 | Talc | 16.7 | A | 64.3 | 86.3 |
| Example 5 | 2.46 | 200 | 58.3 | Triethylene glycol diacetate | 25.0 | Magnesium aluminometasilicate | 16.7 | A | 74.0 | 99.4 |
| Example 6 | 2.46 | 200 | 58.3 | Triethylene glycol diacetate | 25.0 | Magnesium oxide | 16.7 | A | 77.1 | 97.6 |
| Example 7 | 2.46 | 200 | 58.3 | Triacetin | 25.0 | CaCO3 | 16.7 | A | 62.3 | 86.9 |
| Example 8 | 2.46 | 200 | 58.3 | Triacetin | 25.0 | Wood flour | 16 7 | A | 61.5 | 78.3 |

TABLE 1-continued

| | Composition | | | | | | | | Degree of biodegradation in seawater | |
|---|---|---|---|---|---|---|---|---|---|---|
| | CA | | | Plasticizer | | Filler | | | After | After |
| | Degree of substitution | Sulfuric acid (ppm) | mass % | Type | mass % | Type | mass % | Moldability | 90 days (%) | 120 days (%) |
| Example 9 | 2.46 | 200 | 58.3 | Triacetin | 25.0 | Cellulose powder | 16.7 | A | 61.7 | 78.5 |
| Example 10 | 2.46 | 200 | 58.3 | Triacetin | 25.0 | Talc | 16.7 | A | 64.3 | 85.5 |
| Example 11 | 2.46 | 200 | 58.3 | Triacetin | 25.0 | Magnesium aluminometasilicate | 16.7 | A | 73.1 | 97.1 |
| Example 12 | 2.46 | 200 | 58.3 | Triacetin | 25.0 | Magnesium oxide | 16.7 | A | 77.6 | 97.5 |

TABLE 2

| | Composition | | | | | | | | Degree of biodegradation in seawater | |
|---|---|---|---|---|---|---|---|---|---|---|
| | CA | | | Plasticizer | | Filler | | | After | After |
| | Degree of substitution | Sulfuric acid (ppm) | mass % | Type | mass % | Type | mass % | Moldability | 90 days (%) | 120 days (%) |
| Example 13 | 2.46 | 200 | 50.0 | Triethylene glycol diacetate | 21.4 | CaCO3 | 28.6 | A | 72.3 | 97.6 |
| Example 14 | 2.46 | 200 | 50.0 | Triethylene glycol diacetate | 21.4 | Wood flour | 28.6 | A | 64.5 | 80.9 |
| Example 15 | 2.46 | 200 | 50.0 | Triethylene glycol diacetate | 21.4 | Cellulose powder | 28.6 | A | 67.2 | 81.2 |
| Example 16 | 2.46 | 200 | 50.0 | Triethylene glycol diacetate | 21.4 | Talc | 28.6 | A | 72.8 | 99.2 |
| Example 17 | 2.46 | 200 | 50.0 | Triethylene glycol diacetate | 21.4 | Magnesium aluminometasilicate | 28.6 | A | 83.6 | 98.3 |
| Example 18 | 2.46 | 200 | 50.0 | Triethylene glycol diacetate | 21.4 | Magnesium oxide | 28.6 | A | 87.0 | 98.2 |
| Example 19 | 2.46 | 200 | 50.0 | Triacetin | 21.4 | CaCO3 | 28.6 | A | 72.4 | 98.4 |
| Example 20 | 2.46 | 200 | 50.0 | Triacetin | 21.4 | Wood flour | 28.6 | A | 65.5 | 81.0 |
| Example 21 | 2.46 | 200 | 50.0 | Triacetin | 21.4 | Cellulose powder | 28.6 | A | 66.6 | 84.9 |
| Example 22 | 2.46 | 200 | 50.0 | Triacetin | 21.4 | Talc | 28.6 | A | 71.9 | 99.3 |
| Example 23 | 2.46 | 200 | 50.0 | Triacetin | 21.4 | Magnesium aluminometasilicate | 28.6 | A | 82.5 | 97.0 |
| Example 24 | 2.46 | 200 | 50.0 | Triacetin | 21.4 | Magnesium oxide | 28 6 | A | 87.0 | 98.8 |

TABLE 3

| | Composition | | | | | | | | Degree of biodegradation in seawater | |
|---|---|---|---|---|---|---|---|---|---|---|
| | CA | | | Plasticizer | | Filler | | | After | After |
| | Degree of substitution | Sulfuric acid (ppm) | mass % | Type | mass % | Type | mass % | Moldability | 90 days (%) | 120 days (%) |
| Example 25 | 2.15 | 200 | 58.3 | Triethylene glycol diacetate | 25.0 | CaCO3 | 16.7 | A | 80.4 | 98.1 |
| Example 26 | 2.15 | 200 | 58.3 | Triethylene glycol diacetate | 25.0 | Wood flour | 16.7 | A | 72.5 | 98.4 |
| Example 27 | 2.15 | 200 | 58.3 | Triethylene glycol diacetate | 25.0 | Cellulose powder | 16.7 | A | 73.8 | 98.8 |

TABLE 3-continued

| | Composition | | | | | | | | Degree of biodegradation in seawater | |
|---|---|---|---|---|---|---|---|---|---|---|
| | CA | | | Plasticizer | | Filler | | | After | After |
| | Degree of substitution | Sulfuric acid (ppm) | mass % | Type | mass % | Type | mass % | Moldability | 90 days (%) | 120 days (%) |
| Example 28 | 2.15 | 200 | 58.3 | Triethylene glycol diacetate | 25.0 | Talc | 16.7 | A | 79.7 | 98.5 |
| Example 29 | 2.15 | 200 | 58.3 | Triethylene glycol diacetate | 25.0 | Magnesium aluminometasilicate | 16.7 | A | 93.6 | 97.1 |
| Example 30 | 2.15 | 200 | 58.3 | Triethylene glycol diacetate | 25.0 | Magnesium oxide | 16.7 | A | 96.0 | 97.8 |
| Example 31 | 2.15 | 200 | 58.3 | Triacetin | 25.0 | CaCO3 | 16.7 | A | 80.3 | 98.7 |
| Example 32 | 2.15 | 200 | 58.3 | Triacetin | 25.0 | Wood flour | 16.7 | A | 72.8 | 98.7 |
| Example 33 | 2.15 | 200 | 58.3 | Triacetin | 25.0 | Cellulose powder | 16.7 | A | 72.6 | 98.2 |
| Example 34 | 2.15 | 200 | 58 3 | Triacetin | 25.0 | Talc | 16.7 | A | 79.9 | 97.7 |
| Example 35 | 2.15 | 200 | 58.3 | Triacetin | 25.0 | Magnesium aluminometasilicate | 16.7 | A | 92.8 | 98.3 |
| Example 36 | 2.15 | 200 | 58.3 | Triacetin | 25.0 | Magnesium oxide | 16.7 | A | 95.0 | 97.0 |

TABLE 4

| | Composition | | | | | | | | Degree of biodegradation in seawater | |
|---|---|---|---|---|---|---|---|---|---|---|
| | CA | | | Plasticizer | | Filler | | | After | After |
| | Degree of substitution | Sulfuric acid (ppm) | mass % | Type | mass % | Type | mass % | Moldability | 90 days (%) | 120 days (%) |
| Example 37 | 2.46 | 550 | 58.3 | Triethylene glycol diacetate | 25.0 | CaCO3 | 16.7 | B | — | — |
| Example 38 | 2.46 | 550 | 58.3 | Triethylene glycol diacetate | 25.0 | Wood flour | 16.7 | B | — | — |
| Example 39 | 2.46 | 550 | 58.3 | Triethylene glycol diacetate | 25.0 | Cellulose powder | 16.7 | B | — | — |
| Example 40 | 2.46 | 550 | 58.3 | Triethylene glycol diacetate | 25.0 | Talc | 16.7 | B | — | — |
| Example 41 | 2.46 | 550 | 58.3 | Triethylene glycol diacetate | 25.0 | Magnesium aluminometasilicate | 16.7 | B | — | — |
| Example 42 | 2.46 | 550 | 58.3 | Triethylene glycol diacetate | 25.0 | Magnesium oxide | 16.7 | B | — | — |
| Example 42 | 2.46 | 550 | 58.3 | Triacetin | 25.0 | CaCO3 | 16.7 | B | — | — |
| Example 43 | 2.46 | 550 | 58.3 | Triacetin | 25.0 | Wood flour | 16.7 | B | — | — |
| Example 44 | 2.46 | 550 | 58.3 | Triacetin | 25.0 | Cellulose powder | 16.7 | B | — | — |
| Example 45 | 2.46 | 550 | 58.3 | Triacetin | 25.0 | Talc | 16.7 | B | — | — |
| Example 46 | 2.46 | 550 | 58.3 | Triacetin | 25.0 | Magnesium aluminometasilicate | 16.7 | B | — | — |
| Example 47 | 2.46 | 550 | 58.3 | Triacetin | 25.0 | Magnesium oxide | 16.7 | B | — | — |

TABLE 5

| | Composition | | | | | | | | Degree of biodegradation in seawater | |
|---|---|---|---|---|---|---|---|---|---|---|
| | CA | | | Plasticizer | | Filler | | | After 90 days (%) | After 120 days (%) |
| | Degree of substitution | Sulfuric acid (ppm) | mass % | Type | mass % | Type | mass % | Moldability | | |
| Comparative Example 1 | 2.46 | 200 | 100.0 | — | — | — | — | — | 26.3 | 54.0 |
| Comparative Example 2 | 2.46 | 200 | 70.0 | Triethylene glycol diacetate | 30.0 | — | — | A | 34.5 | 66.9 |
| Comparative Example 3 | 2.46 | 200 | 70.0 | Triacetin | 30.0 | — | — | A | 35.6 | 66.5 |
| Comparative Example 4 | 2.15 | 200 | 100.0 | — | — | — | — | — | 50.4 | 77.0 |
| Comparative Example 5 | 2.15 | 200 | 70.0 | Triethylene glycol diacetate | 30.0 | — | — | A | 61.5 | 90.5 |
| Comparative Example 6 | 2.15 | 200 | 70.0 | Triacetin | 30.0 | — | — | A | 61.3 | 90.3 |
| Comparative Example 7 | 2.46 | 200 | 36.8 | Triethylene glycol diacetate | 15.8 | CaCO3 | 47.4 | C | — | — |
| Comparative Example 8 | 2 46 | 200 | 36.8 | Triethylene glycol diacetate | 15.8 | Wood flour | 47.4 | C | — | — |
| Comparative Example 9 | 2.46 | 200 | 36.8 | Triethylene glycol diacetate | 15.8 | Cellulose powder | 47.4 | C | — | — |
| Comparative Example 10 | 2.46 | 200 | 36.8 | Triethylene glycol diacetate | 15.8 | Talc | 47.4 | C | — | — |
| Comparative Example 11 | 2.46 | 200 | 36.8 | Triethylene glycol diacetate | 15.8 | Magnesium aluminometasilicate | 47.4 | C | — | — |
| Comparative Example 12 | 2.46 | 200 | 36.8 | Triethylene glycol diacetate | 15.8 | Magnesium oxide | 47.4 | C | — | — |

TABLE 6

| | Composition | | | | | | | | Degree of biodegradation in seawater | |
|---|---|---|---|---|---|---|---|---|---|---|
| | CA | | | Plasticizer | | Filler | | | After 90 days (%) | After 120 days (%) |
| | Degree of substitution | Sulfuric acid (ppm) | mass % | Type | mass % | Type | mass % | Moldability | | |
| Comparative Example 13 | 2.46 | 200 | 36.8 | Triacetin | 15.8 | CaCO3 | 47.4 | C | — | — |
| Comparative Example 14 | 2.46 | 200 | 36.8 | Triacetin | 15.8 | Wood flour | 47.4 | C | — | — |
| Comparative Example 15 | 2.46 | 200 | 36.8 | Triacetin | 15.8 | Cellulose powder | 47.4 | C | — | — |
| Comparative Example 16 | 2.15 | 200 | 36.8 | Triacetin | 15.8 | Talc | 47.4 | C | — | — |
| Comparative Example 17 | 2.15 | 200 | 36.8 | Triacetin | 15.8 | Magnesium aluminometasilicate | 47.4 | C | — | — |
| Comparative Example 18 | 2.15 | 200 | 36.8 | Triacetin | 15.8 | Magnesium oxide | 47.4 | C | — | — |
| Comparative Example 19 | 2.46 | 200 | 43.8 | Triethylene glycol diacetate | 18.8 | CaCO3 | 37.5 | C | — | — |

CONCLUSION

As indicated in Tables 1 to 6, it was confirmed that the resin compositions of the examples have high plasticity and can be molded, without any problem, by melt extrusion at a temperature of 180° C. Furthermore, it was found that the resin compositions of the examples had a higher degradation rate in seawater, as compared with the resin compositions of the comparative examples that did not include cellulose acetate and a filler.

As indicated in Tables 1 to 6, the resin compositions of the examples are highly evaluated as compared with the resin compositions of the comparative examples. From this evaluation result, the superiority of the present disclosure is clear.

INDUSTRIAL APPLICABILITY

The resin composition described above may be applied to various fields using melt molding and further film formation by melting.

The invention claimed is:

1. A cellulose acetate resin composition comprising: a cellulose acetate (A) having a total degree of acetyl substitution of 2.1 or greater and 2.60 or less; a filler (B); and a plasticizer (C), wherein the filler (B) is one type or two or more types selected from the group consisting of:
(b1) an inorganic compound containing an oxygen atom that binds to any metal element of Na, K, Ca, or Mg;
(b2) a metal salt containing one or more types of metal ions selected from $Na^+$, $K^+$, $Ca^{2+}$, or $Mg^{2+}$ and one or more types of anions selected from a carbonate ion, a bicarbonate ion, a silicate ion, or an aluminate ion,
(b3) cellulose or hemicellulose, and
(b4) wood flour,
the plasticizer (C) is one type or two or more types selected from the group consisting of:
(c1) a glycerin ester in which at least one hydroxyl group of glycerin is esterified,
(c2) an ether in which at least one terminal hydroxyl group of polyalkylene glycol is etherified, and
(c3) a glycol ester in which at least one terminal hydroxyl group of polyalkylene glycol is esterified,
a content of the cellulose acetate (A) is 45 mass % or greater and 90 mass % or less, a total content of the filler (B) is 5 mass % or greater and 50 mass % or less, and a total content of the plasticizer (C) is 7 mass % or greater and 35 mass % or less, with respect to a total of the resin composition, and
a degree of acetyl substitution at 2-position C2, a degree of acetyl substitution at 3-position C3, and a degree of acetyl substitution at 6-position C6 of the cellulose acetate satisfy the following condition: $(C2+C3)/2>C6$.

2. The resin composition according to claim 1, wherein a total content of the cellulose acetate (A), the filler (B), and the plasticizer (C) in the resin composition is 85 mass % or greater.

3. The resin composition according to claim 2, wherein the total content of the cellulose acetate (A), the filler (B), and the plasticizer (C) in the resin composition is 95 mass % or greater.

4. The resin composition according to claim 1, wherein the glycerin ester (c1) is a glycerin acetate having a degree of acetyl substitution of 0 or greater and 3 or less.

5. The resin composition according to claim 1, wherein the glycerin ester (c1) is a compound esterified with a carboxylic acid having a molecular weight of 150 or less.

6. The resin composition according to claim 1,
wherein the ether (c2) is a polyalkylene glycol in which an average degree of substitution of the terminal hydroxyl group etherified with a hydrocarbon group having a molecular weight of 150 or less is 0 or greater and 2 or less, and
the polyalkylene glycol has an alkyleneoxy group having 2 or greater and 4 or less carbon atoms as a repeating unit, and has a degree of polymerization of 23 or less.

7. The resin composition according to claim 6, wherein the hydrocarbon group is a saturated aliphatic hydrocarbon group.

8. The resin composition according to claim 1,
wherein the glycol ester (c3) is a polyalkylene glycol in which an average degree of substitution of the terminal hydroxyl group esterified with a carboxylic acid having a molecular weight of 150 or less is 0 or greater and 2 or less, and
the polyalkylene glycol has an alkyleneoxy group having 2 or greater and 4 or less carbon atoms as a repeating unit, and has a degree of polymerization of 23 or less.

9. The resin composition according to claim 8, wherein the glycol ester (c3) has a number average molecular weight of 200 or greater and 1000 or less.

10. The resin composition according to claim 8, wherein the carboxylic acid is a saturated fatty acid.

11. The resin composition according to claim 1, wherein the plasticizer (C) is one type or two or more types selected from the group consisting of:
(c2) the ether in which at least one terminal hydroxyl group of polyalkylene glycol is etherified, and
(c3) the glycol ester in which at least one terminal hydroxyl group of polyalkylene glycol is esterified.

12. The resin composition according to claim 1, wherein the total content of the plasticizer (C) is 9 mass % or greater and 33 mass % or less with respect to the total of the resin composition.

13. The resin composition according to claim 1, wherein the filler (B) is one type or two or more types selected from the group consisting of:
(b1) the inorganic compound containing an oxygen atom that binds to any metal element of Na, K, Ca, or Mg; and
(b2) the metal salt containing one or more types of metal ions selected from $Na^+$, $K^+$, $Ca^{2+}$, or $Mg^{2+}$ and one or more types of anions selected from a carbonate ion, a bicarbonate ion, a silicate ion, or an aluminate ion.

14. The resin composition according to claim 1, wherein the total content of the filler (B) is 15 mass % or greater and 40 mass % or less with respect to the total of the resin composition.

15. The resin composition according to claim 1, wherein a sulfuric acid component amount of the cellulose acetate (A) is 350 ppm or less.

16. The resin composition according to claim 1, wherein the content of the cellulose acetate (A) is 50 mass % or greater and 80 mass % or less.

17. The resin composition according to claim 1, wherein the cellulose acetate (A) has the total degree of acetyl substitution of 2.1 or greater and 2.50 or less.

18. The resin composition according to claim 1, further comprising triethylene glycol diacetate or triacetin.

* * * * *